United States Patent [19]

Wilcox et al.

[11] Patent Number: 5,075,896
[45] Date of Patent: Dec. 24, 1991

[54] CHARACTER AND PHONEME RECOGNITION BASED ON PROBABILITY CLUSTERING

[75] Inventors: Lynn D. Wilcox, Portola Valley; A. Lawrence Spitz, Palo Alto, both of Calif.

[73] Assignee: Xerox Corporation, Stamford, Conn.

[21] Appl. No.: 427,148

[22] Filed: Oct. 25, 1989

[51] Int. Cl.$^5$ .............................................. G10L 5/00
[52] U.S. Cl. ........................................ 382/39; 381/41
[58] Field of Search ...................... 381/41, 43; 382/39, 382/14

[56] References Cited

U.S. PATENT DOCUMENTS

| | | | |
|---|---|---|---|
| 3,643,215 | 2/1972 | Ingham et al. | 340/146.3 |
| 3,755,780 | 8/1973 | Sammon et al. | 340/146.3 |
| 3,810,162 | 5/1974 | Ewing, Jr. et al. | 340/172.5 |
| 3,969,698 | 7/1976 | Bollinger et al. | 340/146.3 |
| 4,180,799 | 12/1979 | Smith | 340/146.3 |
| 4,541,115 | 9/1985 | Werth | 282/14 |
| 4,773,099 | 9/1988 | Bokser | 382/14 |
| 4,783,804 | 11/1988 | Juang et al. | 381/43 |
| 4,837,831 | 6/1989 | Gillick et al. | 381/41 |
| 4,903,305 | 2/1990 | Gillick et al. | 381/41 |
| 4,958,375 | 9/1990 | Reilly et al. | 382/14 |

FOREIGN PATENT DOCUMENTS

| | | |
|---|---|---|
| 283266A | 3/1988 | European Pat. Off. . |
| 0370766 | 5/1990 | European Pat. Off. . |

OTHER PUBLICATIONS

Kundu, A., and Bahl, P., "Recognition of Handwritten Script: A Hidden Markov Model Based Approach", *International Conference on Acoustics, Speech, and Signal Processing*, New York, Apr. 1988, pp. 928-931.

Goshtasby, A., and Ehrich, R. W., "Coontextual Word Recognition Using Probabilistic Relaxation Labeling", *Pattern Recognition*, vol. 21, No. 5, 1988, pp. 455-462.

Kahan, S., Pavlidis, T., and Baird, H. S., "On the Recognition of Printed Characters of Any Font and Size", *IEEE Transactions on Pattern Analysis and Machine Intelligence*, vol. PAMI-9, No. 2, Mar. 1987, pp. 274-288.

Nagy, G., "Optical Character Recognition—Theory and Practice", in Krishnaiah, P. R., and Kanal, L. N., eds., Handbook of Statistics, vol. 2, North-Holland, 1982, pp. 621 and 633-643.

Bozinovic, R., and Srihari, S. N., "Knowledge-Based Cursive Script Interpretation", *Seventh International Conference on Pattern Recognition, Montreal, Canada, Jul. 30-Aug. 2, 1984, Proceedings*, vol. 2, pp. 774-776.

Burton, D. K., Shore, J. E., and Buck, J. T., "Isolated—Word Speech Recognition Using Multisection Vector Quantization Codebooks", *IEEE Transactions on Acoustics, Speech, and Signal Processing*, vol. ASSP-33, No. 4, Aug. 1985, pp. 837-849.

Tou, J. T., and Gonzalez, R. C., *Pattern Recognition Principles*, Addison-Wesley, London, 1974, pp. 97-100.

*Primary Examiner*—Stephen Brinich
*Attorney, Agent, or Firm*—James T. Beran

[57] ABSTRACT

Prior to character or phoneme recognition, a classifier provides a respective probability list for each of a sequence of sample characters or phonemes, each probability list indicating the respective sample's probability for each character or phoneme type. These probability lists are clustered in character or phoneme probability space, in which each dimension corresponds to the probability that a character or phoneme candidate is an instance of a specific character or phoneme type. For each resulting cluster, data is stored indicating its cluster ID and a probability list indicating the probability of each type at the cluster's center. Then, during recognition, a probability cluster identifier compares the probability list for each candidate with the probability list for each cluster to find the nearest cluster. The cluster identifier then provides the nearest cluster's cluster ID to a constraint satisfier that attempts to recognize the candidate based on rules, patterns, or a combination of rules and patterns. If necessary, the constraint satisfier uses the cluster ID to retrieve the stored probability list of the cluster to assist it in recognition.

26 Claims, 5 Drawing Sheets

CHARACTER AND PHONEME RECOGNITION BASED ON PROBABILITY CLUSTERING

BACKGROUND OF THE INVENTION

The present invention relates to techniques for recognizing characters and phonemes. More specifically, the invention relates to techniques that use a set of probable character or phoneme identities to recognize an unknown input character or phoneme.

Kundu, A., and Bahl, P., "Recognition of Handwritten Script: A Hidden Markov Model Based Approach," *International Conference on Acoustics, Speech, and Signal Processing*, New York, April 1988, pp. 928-931, describe a letter-based word recognizer whose output is either the correctly recognized word or a small set of words which includes the correct word as one of its hypotheses. Page 929 describes a set of features for which, with sample letters, optimum symbols are generated using a vector quantizer algorithm and the unweighted Euclidean distance as the distance measure. The feature vectors of each letter are then classified as one of the symbols according to a minimum distance criterion, the nearest neighbor rule, and a probability is then determined in relation to the symbol. These symbols are then used for recognition in conjunction with a hidden Markov model.

Goshtasby, A., and Ehrich, R. W., "Contextual Word Recognition Using Probabilistic Relaxation Labeling," *Pattern Recognition*, Vol. 21, No. 5, 1988, pp. 455-462, describe a contextual word recognition technique that uses probabilistic relaxation labeling. As shown and described in relation to FIG. 1, a contextual word recognition system includes a character recognizer module that assigns to each input character 26 numbers showing the confidences that the character in the input has labels from a to z. The confidences are then transformed to probabilities. The output of the character recognizer is actually a sequence of sets called substitution sets, each of which contains the alternatives for a particular character with nonzero probability. All possible words would be obtained by selecting one character from each of the substitution sets, but only one of the words that can be formed from the substitution sets is the correct word. A postprocessor identifies the correct word from the sequence of substitution sets using contextual information from the language. Section 2, beginning on page 456, reviews the major postprocessing techniques. Sections 3 and 4 introduce and describe results produced by a proposed postprocessor that uses transition probabilities of characters to refine the label probabilities in a word iteratively until the probabilities converge and determine a unique word. FIG. 5 shows how the postprocessor works on an input word's similarity measures, setting low similarity measures to zero and transforming the remaining similarities to probability values on which a relaxation process is applied iteratively until the most consistent labeling is obtained.

Bokser, U.S. Pat. No. 4,773,099, describes pattern classification techniques that classify unknown input characters. During a preprocessing phase, reference data are analyzed to form "ringed clusters" for each class of input data. If the input data are characters, a set of ringed clusters is associated with each character class. These ringed clusters are formed so as to be used later during the classification of an unknown input character. As shown and described in relation to FIGS. 12-13 and the subsequent figures, the classification module produces a possibility set which is a list of characters which the unknown character might be, with associated confidences. As described beginning at col. 23, line 32, a possibility set that includes no character candidates can be sent for postprocessing to a spelling corrector module that uses contextual information to replace it with a single character candidate. A possibility set that includes more than one character candidate can be sent on to other modules, such as a subline checker and context module, so that only one character candidate remains in the possibility set after this postprocessing is complete. The confidences can be used to flag characters that were not recognized with certainty so that they can be examined by a word processing operator. The confidence values can also be used by the post processing modules to assist in choosing one of the character candidates.

Bollinger et al., U.S. Pat. No. 3,969,698, describe a cluster storage apparatus for post processing error correction in character and phoneme recognition. As shown and described in relation to FIG. 6, a cluster storage apparatus outputs groups of valid alpha words as potential candidates for the correct form of a misrecognized word. A transfer function is measured to determine the propensity for misread, and is expressed as a series of equations representing each character's probability of being confused into a false output character. As shown and described in relation to FIG. 7, the cluster storage apparatus provides a group of correct words that have some probability of having been confused with an invalid word to a regional context apparatus. The regional context apparatus executes a conditional probability analysis to determine which of the correct words most closely corresponds to the invalid word.

Kahan, S., Pavlidis, T., and Baird, H. S., "On the Recognition of Printed Characters of Any Font and Size," *IEEE Transactions on Pattern Analysis and Machine Intelligence*, Vol. PAMI-9, No. 2, March 1987, pp. 274-288, describe omnifont, variable size character recognition. Section III describes a primary classifier that recognizes a character from a structural description with a statistical Bayesian classifier that uses binary features. Feature-defining regions in a parameter space are selected by an automatic clustering algorithm, producing clusters as illustrated in FIG. 5. The clusters are pruned to about 100 distinct stroke-clusters, 30 of which are shown in FIG. 8. The output of the primary classifier is a short list of classifications, in decreasing order of estimated a posteriori probability. Section IV describes how contour analysis is also used if the result of classification falls into one of a few suspect confusion groups. Section VI describes an array of structures, each consisting of a bounding box and the first k choices of the classifier, each choice consisting of a name and a figure of merit proportional to the logarithm of the posterior probability. Layout context and linguistic context are then used to disambiguate, with the linguistic context including spelling, grammar, and punctuation rules Section VII describes spelling correction of misspelled words.

Nagy, G., "Optical Character Recognition—Theory and Practice," in Krishnaiah, P. R., and Kanal, L. N., eds., *Handbook of Statistics*, Vol. 2, North-Holland, 1982, pp. 621 and 633-643, presents an overview of character recognition techniques. Pages 634-639 describe several approaches to character classification and discuss the conditional probability functions $P(v|a_k)$ of observing the signal $v$ when the class of the pattern under consideration is $a_k$. Page 634 mentions the possibility of rejecting a character, i.e. not assigning it to any class, shown in FIG. 5 as a "reject" decision; page 634 also mentions that the optimal decision consists of selecting the class $a_k$ for which the a posteriori probability $P(a_i|v)$ is the largest, and provides Bayes' formula for computation of the a posteriori class probabilities. Pages 639–643 describe recognition techniques that use contextual information.

Bozinovic, R., and Srihari, S. N., "Knowledge-based Cursive Script Interpretation," *Seventh International Conference on Pattern Recognition*, Montreal, Canada, July 30–Aug. 2, 1984, Proceedings, Vol. 2, pp. 774–776, describe a knowledge-based approach to word-level off-line cursive script recognition. As shown and described in section I in relation to FIG. 1, the overall process includes presegmentation, lexicon lookup, and letter hypothesizing, and results in an ASCII word. Section III describes presegmentation, letter hypothesization, and lexical representation, with the lexicon being organized in the form of a trie.

Ingham et al., U.S. Pat. No. 3,643,215, describe a pattern recognition device in which a pattern presented for classification is initially searched and descriptors are produced, as shown and described in relation to FIGS. 1 and 3. Descriptors are used to obtain a list of feature names, and, in turn, to obtain a class name prediction. The class name is then used to predict a feature. A confidence level is varied in accordance with the success of the predictions until it exceeds an acceptance threshold, in which case the class name is provided, as shown and described in relation to FIGS. 2 and 3.

Burton, D. K., Shore, J. E., and Buck, J. T., "Isolated-Word Speech Recognition Using Multisection Vector Quantization Codebooks," *IEEE Transactions on Acoustics, Speech, and Signal Processing*, Vol. ASSP-33, No. 4, August 1985, pp. 837–849, describe an approach to isolated-word speech recognition using vector quantization (VQ). Page 837 describes a previous approach in which a VQ codebook is generated for each word in the recognition vocabulary by applying an iterative clustering technique to a training sequence containing several repetitions of the vocabulary word. The clustering process represents each vocabulary word as a set of independent spectra. The new method described in the article incorporates time-sequence information by means of a sequence of VQ codebooks referred to as multisection codebooks, described in more detail at page 839. As described at page 838, new words are classified by performing VQ and finding the multisection codebook that achieves the smallest average distortion.

Juang et al., U.S. Pat. No. 4,783,804, describe the use of Markov model speech pattern templates in speech recognition. FIGS. 4–6 show steps in the formation of Markov model templates, and FIG. 5 shows steps in separating frame feature signals into clusters.

SUMMARY OF THE INVENTION

The present invention provides techniques for recognizing a character or phoneme candidate based on the intermediate recognition of a cluster of character or phoneme probabilities. Furthermore, the invention provides techniques for using a character or phoneme probability cluster identifier in recognition. For example, the cluster identifier can be used to retrieve data defining the cluster's character or phoneme probabilities.

One aspect of the invention is based on the recognition of a fundamental problem in conventional approaches to character and phoneme recognition. Each character or phoneme candidate is typically classified as an instance of a single character or phoneme type; of a short list of character or phoneme types, either of a fixed length or having probabilities exceeding a fixed threshold; or as a questionable character or phoneme, a character or phoneme on which a conclusion cannot be reached, perhaps because none of the probabilities exceed a fixed threshold. The result of classification is transferred to a postclassifier or postprocessor before continuing to the next candidate in sequence. But classifying in this manner needlessly discards information about other character or phoneme types that could apply to the candidate, information that is often useful in recognition.

This aspect is further based on the discovery that this problem can be solved by taking a different approach. Rather than classifying each candidate as an instance of a single most probable type or of a short list of most probable types, a technique according to the invention identifies which one of a number or character or phoneme probability clusters is nearest to the candidate, based on a complete set of probabilities for the candidate. The probability clusters are defined in character or phoneme probability space, with each cluster having a respective probability for every character or phoneme type in a set of character or phoneme types. Therefore, identifying which cluster is nearest to a candidate provides relatively accurate information about its probability for any type.

Another aspect of the invention is based on the recognition of a fundamental problem in the architecture of conventional character or phoneme recognition systems. Such systems conventionally retain all information about a candidate until the candidate is classified as an instance of a single most probable type or of one of a small number of most probable types. Data indicating the most probable type or types can then be provided to a postclassifier or postprocessor. To transfer more complete information about a candidate between processes or processors would require a higher bandwidth, which would interfere with the conventional low bandwidth connection between a classifier and a postclassifier that is necessary for modularization. Modularization is important because it allows different postclassifiers to be used with a given classifier, and also allows different classifiers to be used with a given postclassifier. In short, it is difficult to provide a system that is modular and that provides complete information to a postclassifier or postprocessor.

This aspect is further based on the recognition that the low bandwidth connection between modules of a recognition system does not preclude the transfer of relatively complete information about each candidate. In other words, an upstream module of a recognition system can provide relatively complete information about each candidate to a downstream module that performs further processing.

This solution can be implemented by providing, for each candidate, data identifying a probability cluster that is nearest to the candidate in character or phoneme probability space and that has a respective probability for each recognizable type. The data identifying each cluster (referred to herein as a "cluster ID") can itself be used in obtaining data identifying a character or phoneme type (referred to herein as a "character ID" or a "phoneme ID") through any appropriate constraint satisfaction technique. If necessary to reach a conclusion, the cluster ID can be used to retrieve the cluster's respective probability for one or more types, appropriate data about the probabilities being stored during a preliminary training phase for retrieval during a subsequent identification phase.

This implementation allows modularity between a probability cluster identifier and a constraint satisfier, with a low bandwidth connection between them for transmission of cluster IDs. During a training phase, the cluster identifier stores data about the character or phoneme probabilities for each cluster, and during an identification phase, the constraint satisfier can use a cluster ID to retrieve the corresponding probability data. One advantage of this solution is that, during identification, the constraint satisfier depends on the probability cluster identifier only to provide a sequence of cluster IDs. As a result, the constraint satisfier can operate over an arbitrarily large context with relatively complete information about each candidate within that context, the information being obtained in a compact form from the cluster IDs. The probability cluster identifier and constraint satisfier can be independent processes operating on a single processor or can operate on parallel processors, and in either case the use of cluster IDs will allow a relatively low bandwidth link between the processes.

The following description, the drawings, and the claims further set forth these and other objects, features and advantages of the invention.

DETAILED DESCRIPTION

A. Conceptual Framework

The following conceptual framework is helpful in understanding the broad scope of the invention, and the terms defined below have the meanings indicated throughout this application, including the claims.

A "word" is the smallest unit of meaning in a language. "Written words" means words recorded in the form of discrete elements such as alphabetical, numerical, or pictographic elements. "Spoken words" or "speech" means words received in a continuous form such as from an utterance of a speaker. Words recorded in continuous form such as recorded speech are therefore not written words, but are spoken words when played back. An "isolated spoken word" is a spoken word that is received discretely from any preceding or following words.

A "text" is an arrangement of written words, ordinarily a sequence. A text may thus include zero or more words, each with at least one discrete element.

A "character" means a discrete element appearing in text. Characters can thus include not only alphanumeric elements, but also punctuation marks, diacritical marks, and other elements included in text. A "character type" is a category of which a character may be an instance, such as a letter or number.

A "phoneme" means an element that is a part of a sequence of elements that occurs in speech. The phonetical representation of a word as found in a dictionary is a sequence of phonemes. A "phoneme type" is a category of which a phoneme may be an instance.

A "character candidate" is any part of a text that is separately presented to a system for classification or identification. In typical character recognition systems, a character candidate is a part of the text that has been segmented on the basis of criteria that indicate the character candidate is a character.

A "phoneme candidate" is any part of an utterance that is separately presented to a system for classification or identification. In typical phoneme recognition systems, a phoneme candidate is a part of an utterance that has been segmented on the basis of criteria that indicate the phoneme candidate is a phoneme.

A "candidate" can mean either a character candidate or a phoneme candidate.

A "character probability space" is a mathematical space in which each dimension indicates the probability that a candidate is an instance of a specific character type. A "phoneme probability space" is a mathematical space in which each dimension indicates the probability that a candidate is an instance of a specific phoneme type.

A "character probability cluster" is a statistically defined region of a character probability space in which characters or character candidates occur. A character probability cluster may, for example, be defined by the mean of the probabilities of the characters and character candidates occurring in it or by another statistical measure of its center. It could further be defined by the variance of characters' and candidates' probabilities occurring in it or by another statistical measure of its shape or size.

A "phoneme probability cluster" is a statistically defined region of a phoneme probability space in which phonemes or phoneme candidates occur. A phoneme probability cluster may, for example, be defined by the mean of the probabilities of the phonemes and phoneme candidates occurring in it or by another statistical measure of its center. It could further be defined by the variance of phonemes' and candidates' probabilities occurring in it or by another statistical measure of its shape or size.

A "cluster" can mean either a character probability cluster or a phoneme probability cluster.

A "cluster ID" is data indicating one of a set of clusters. A "character ID" is data indicating one of a set of character types. A "phoneme ID" is data indicating one of a set of phoneme types.

The "distance" between a cluster and a candidate can be defined by the Euclidean distance between candidate probabilities or any other statistical measure of distance.

One of a number of clusters is "nearest" to a candidate when the distance between the cluster and the candidate is smaller than the distance between any of the other clusters and the candidate.

A "constraint satisfier" is any component of a system that determines whether data presented to it satisfies a set of constraints. A constraint satisfier could be a process, a processor, or any other component capable of determining whether data satisfies constraints. It could handle the constraints in any suitable form, including rules or patterns or any combination of rules and patterns.

B. General Features

Figure 1:
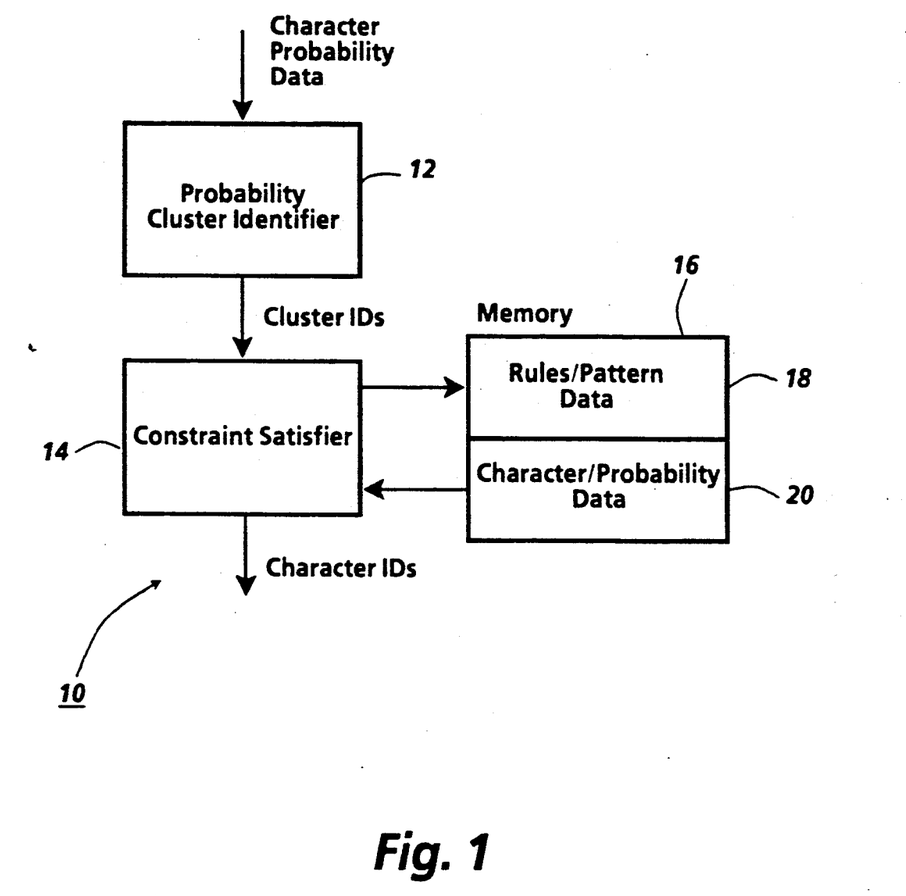
FIG. 1 is a schematic block diagram showing some functional components of a recognition system according to the invention.
Figure 2:
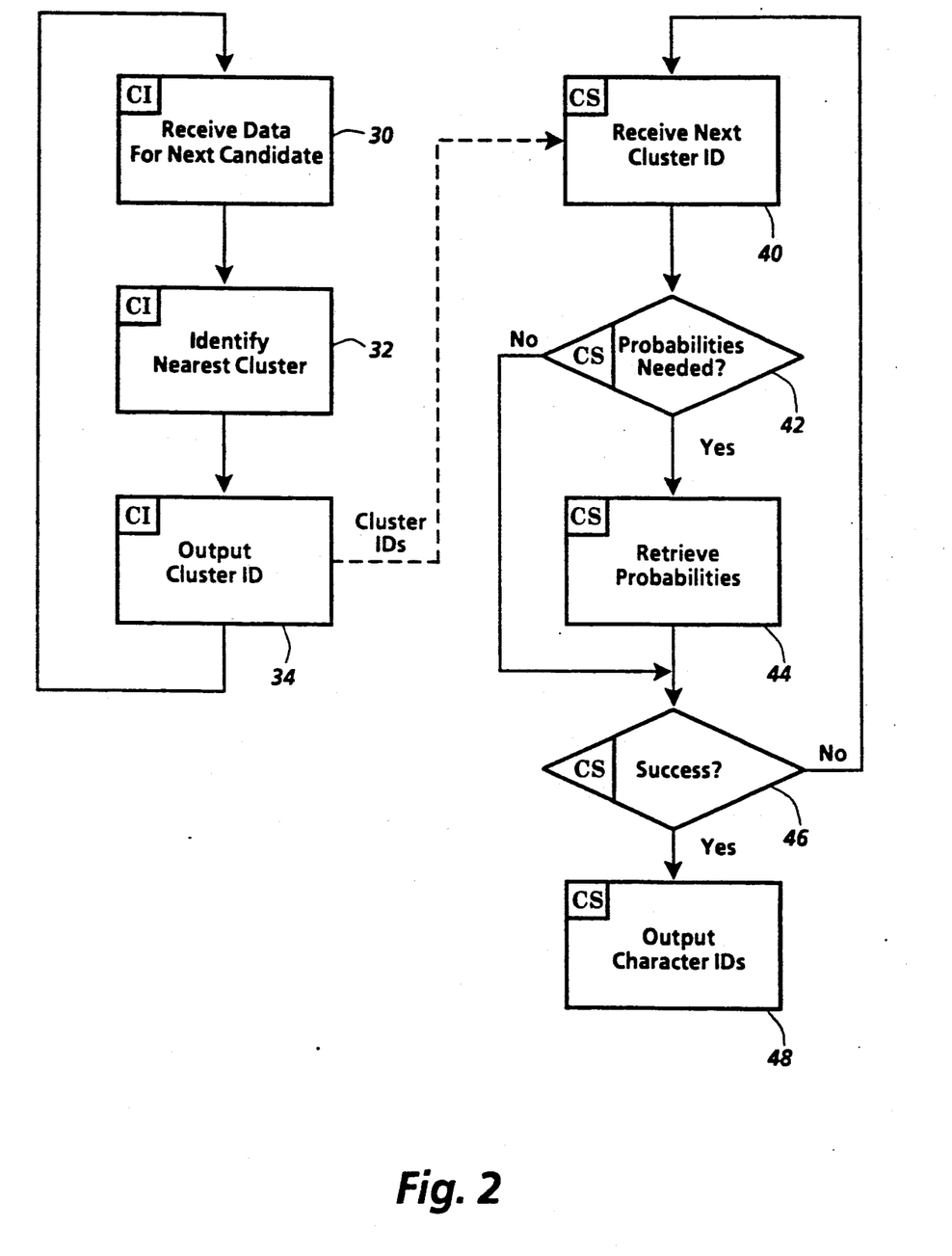
FIG. 2 is a flow diagram showing steps performed by the probability cluster identifier and constraint satisfier of FIG. 1.

General features of the invention can be understood from FIGS. 1 and 2. FIG. 1 shows some components of a system implementing features of the invention. FIG. 2 shows steps performed by components of the system of FIG. 1.

The following description of general features is couched in terms of characters and character recognition, but is equally applicable to phonemes and phoneme recognition, except as otherwise noted.

FIG. 1 illustrates some components of character recognition system 10. System 10 can also include other conventional components that are not shown, such as a component that segments data about a text whose characters are to be recognized into character candidates and a component that obtains data relating to each candidate. Probability cluster identifier 12 receives data about each candidate in sequence, and the data it receives could, as shown, be probability data indicating, for each recognizable character type, the probability that the candidate is of that type. Identifier 12 determines which of a number of clusters is nearest to each candidate, and the clusters can be character probability clusters, as defined above. Upon determining that a given cluster is nearest to a candidate, identifier 12 provides the corresponding cluster ID as its output.

Constraint satisfier 14 receives the cluster IDs from identifier 12 and retrieves relevant data from memory 16. Memory 16 illustratively stores rules/pattern data 18 relating to rules and patterns that constraint satisfier 14 may use in determining whether a sequence of cluster IDs satisfies relevant constraints. Memory 16 also stores character/probability data 20 that can be accessed based on a cluster ID to obtain the respective probability of a specific character type for that cluster. Based on the retrieved data and the cluster IDs, constraint satisfier 14 obtains a sequence of character IDs, which it provides as its output. Constraint satisfier 14 could alternatively provide word identifiers as its output.

FIG. 2 shows steps performed by probability cluster identifier 12, indicated by the letters "CI," and constraint satisfier 14, indicated by the letters "CS."

In box 30, identifier 12 receives data for the next candidate, such as probability data for the character types as discussed above. In box 32, the nearest cluster is identified, and in box 34, its cluster ID is output before returning to receive data for the next candidate in box 30.

In box 40, constraint satisfier 14 receives the next cluster ID from identifier 12. In the course of performing constraint satisfaction, the branch in box 42 is performed based on whether data about the respective probability of a specific character type is needed in relation to the cluster ID. If so, the step in box 44 retrieves the required probabilities. The branch in box 46 depends on whether constraint satisfaction is successful: If so, constraint satisfier 14 provides the identified character IDs as output in box 48; if not, it returns to receive the next cluster ID in box 40.

We turn now to consider how the invention could be implemented.

C. An Implementation

Figure 3:
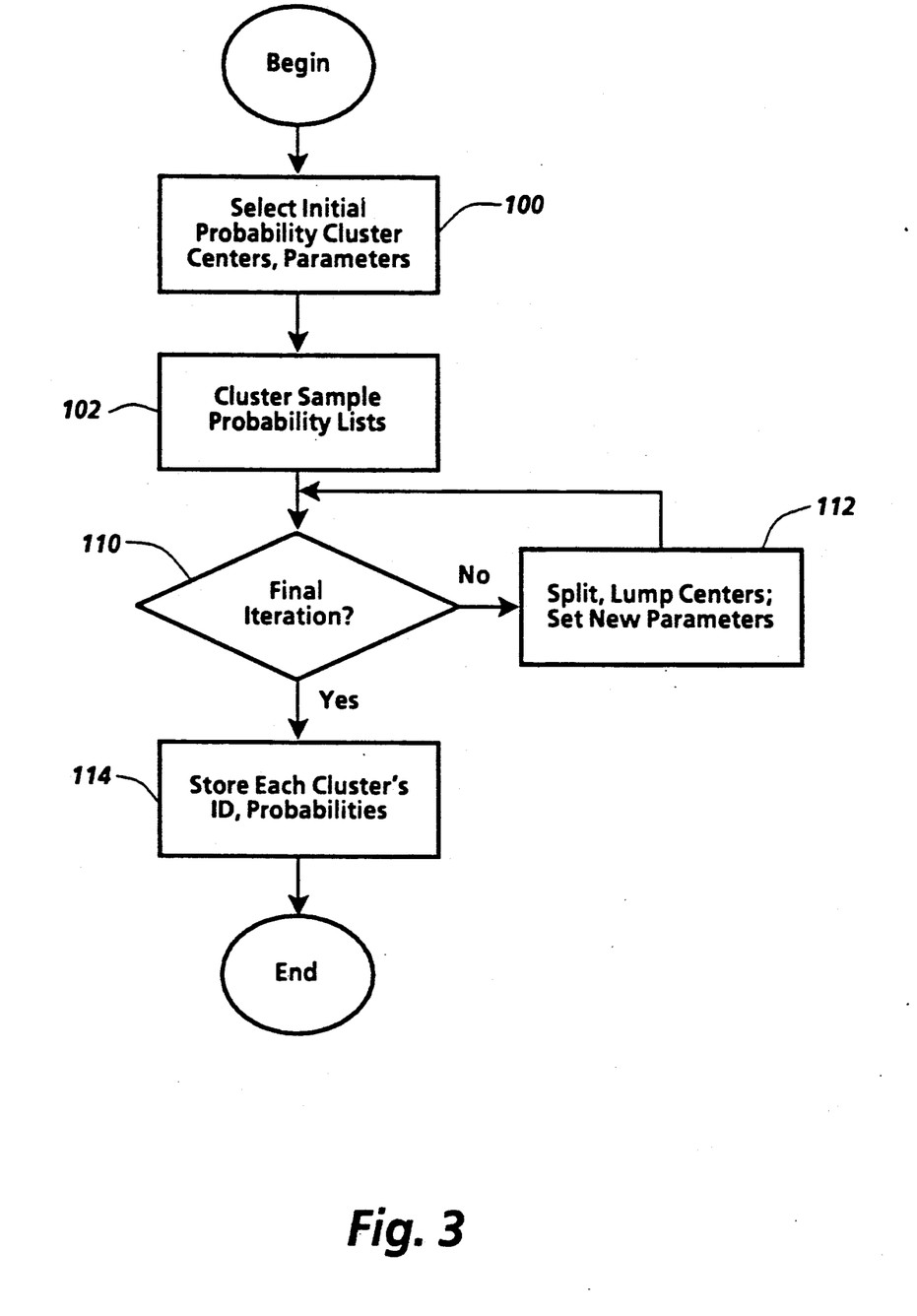
FIG. 3 is a flow chart showing steps performed during a training phase of a probability cluster identifier.
Figure 4:
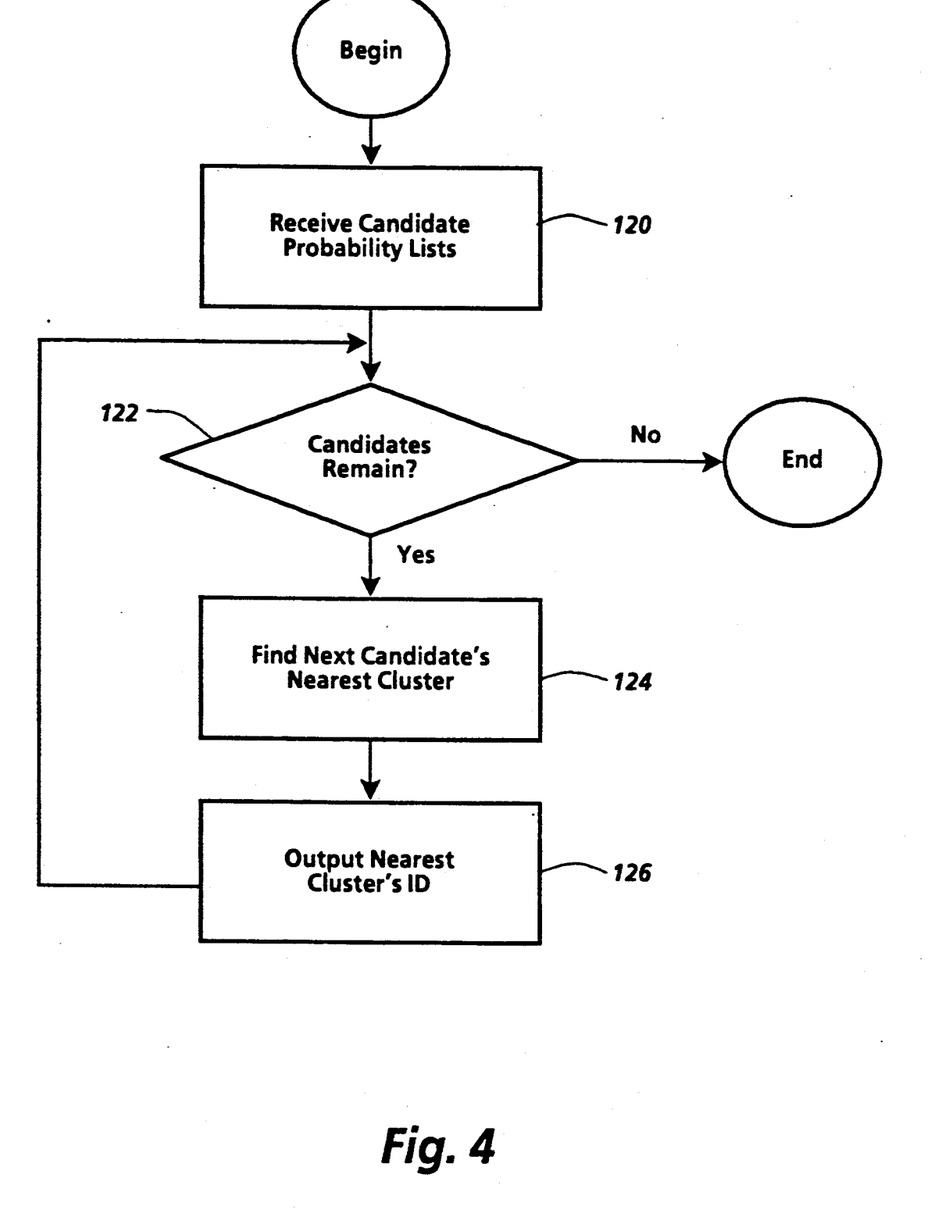
FIG. 4 is a flow chart showing steps performed during an identification phase by a probability cluster identifier.
Figure 5:
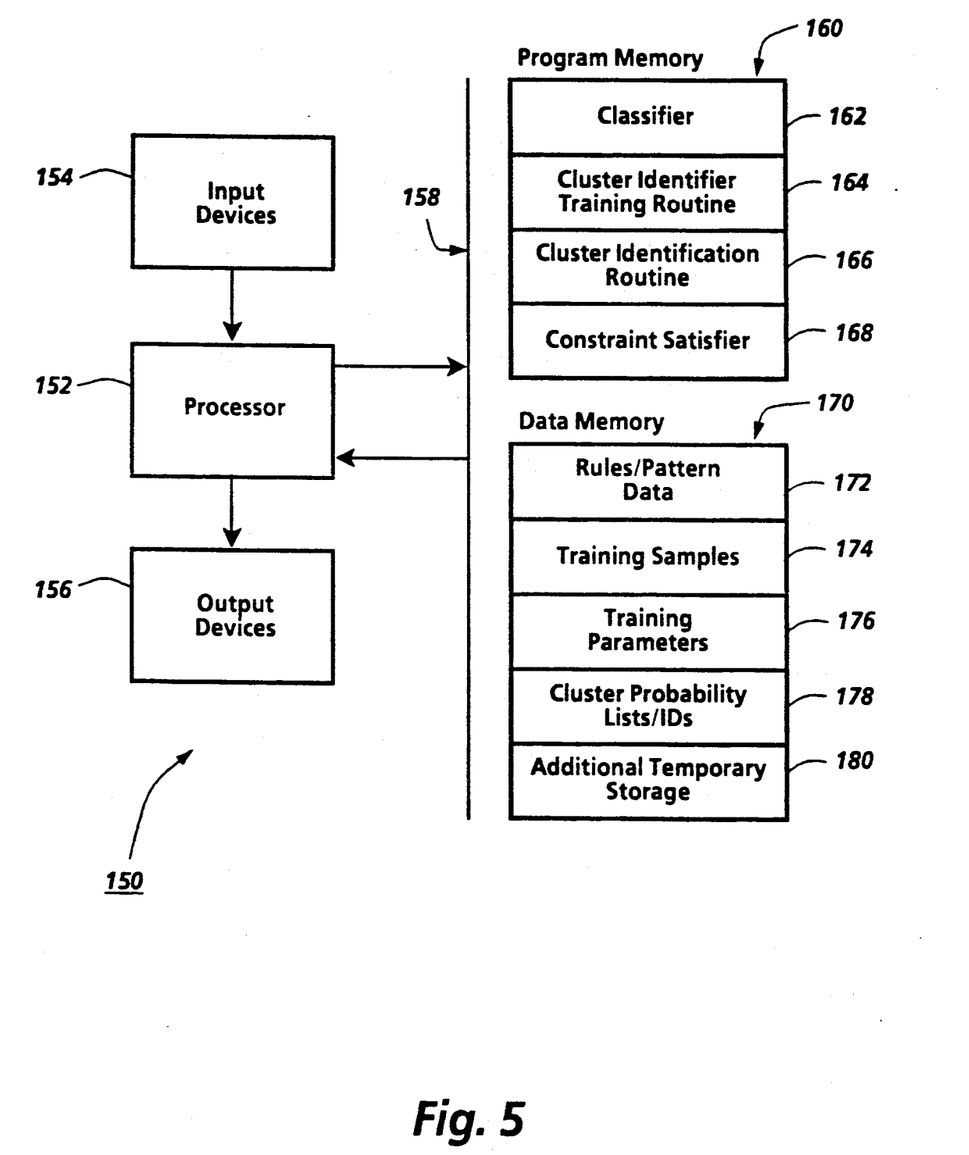
FIG. 5 is a schematic diagram showing the components of a system that can perform the steps in FIGS. 3 and 4.

The invention could be implemented in a variety of ways. FIGS. 3-5 illustrate an implementation suitable for a single serial processor. FIG. 3 illustrates steps in the cluster identifier's training phase, and FIG. 4 illustrates steps in its identification phase. FIG. 5 shows components of a system that executes the steps in FIGS. 3 and 4.

The training phase in FIG. 3 generally follows the steps of the Isodata algorithm described in Tou, J. T., and Gonzalez, R. C., *Pattern Recognition Principles*, Addison-Wesley, London, 1974, pp. 97-100, incorporated herein by reference. As noted there, the Isodata algorithm is similar in principle to K-means clustering. K-means clustering or any other appropriate algorithm could be used in the training phase, provided that the result is a set of clusters in character or phoneme probability space, each with a respective set of probabilities and a cluster ID. The coordinates of the mean or other statistical center of each cluster can, for example, serve as its probabilities.

In the step in box 100, the user selects initial probability cluster centers and parameters, as in step 1 of the Isodata algorithm. These initial cluster centers could be randomly chosen. The number of cluster centers desired could be three times the number of recognizable characters or phonemes. The minimum number of samples per cluster could be 5. The standard deviation parameter could be set to the minimum component of the sample standard deviation for all the training data. The lumping parameter could be set to one-third of the standard deviation parameter. The maximum number of pairs of cluster centers which can be lumped could be set to 2. The number of iterations allowed could initially be set to 100, subject to being increased as convergence and computer time allow.

The step in box 102 then clusters a set of sample probability lists and performs related computations, as in steps 2 through 6 of the Isodata algorithm. The sample probability lists should be obtained from the same classifier that will be used in the identification phase. The classifier can be a decision tree or any other conventional classifier that provides a complete probability list for a candidate. In order to provide the sample probability lists for clustering in box 102, the classifier should operate on text or speech that is fairly representative of the text or speech to be identified in the identification phase. The result of clustering will be a new set of cluster centers, each with a corresponding center whose coordinates define a complete probability list.

When clustering is completed, the training phase branches in box 110 based on whether the final iteration has been performed. If not, the step in box 112 splits cluster centers if appropriate, lumps cluster centers if appropriate, allows the user to set new parameters, and performs related computations, as in steps 7-13 of the Isodata algorithm. Then, the training phase returns to cluster the sample probability lists again, in box 102.

When the final iteration has been performed, the step in box 114 stores, for each final cluster, its ID and the coordinates of its center, which define a corresponding probability list. This completes the training phase.

The identification phase, in FIG. 4, begins in box 120 by receiving a set of candidate probability lists for identification. These probability lists should be provided by the same classifier that provided the sample probability lists that were clustered in box 102 in FIG. 3, and could be received asynchronously from the classifier through a buffer or buffering data structure.

The step in box 122 begins an iterative loop that handles each of the candidate probability lists from the buffer in sequence. The step in box 124 compares the next candidate probability list to the probability lists of the final clusters, as stored in box 114 in FIG. 3, to find the nearest cluster. This comparison could be done with a Euclidean distance or with a Mahalanolis distance. When the nearest cluster is found, its cluster ID is output in box 126, and the identification phase then returns to the step in box 122, continuing until no candidates remain to be handled, at which time the identification phase is complete.

The steps in FIG. 4 correspond to steps performed by the cluster identifier in FIG. 2. Box 120 corresponds to box 30; box 124 corresponds to box 32, and box 126 corresponds to box 34.

FIG. 5 shows system 150 for performing the steps in FIGS. 3 and 4. System 150 includes processor 152, a workstation CPU or other appropriate processor. Processor 152 receives inputs through input devices 154, which may include a text scanner, a speech receiver, a keyboard with mouse, and other appropriate devices. Processor 152 provides outputs through output devices 156, which may include a CRT or other display. Processor also accesses memory 158 during its operations.

Memory 158 illustratively includes program memory 160 and data memory 170, although memory 158 could be managed in any appropriate way. Program memory 160 includes classifier 162, cluster identifier training routine 164 which could be implemented as in FIG. 3, cluster identification routine 166 which could be implemented as in FIG. 4, and constraint satisfier 168 which could be implemented with techniques as described in copending, coassigned U.S. patent application Ser. No. 07/427,147, entitled "Contextual Character or Phoneme Recognition Based on String Recognition" and incorporated herein by reference. Data memory 170 includes rules/pattern data 172 for constraint satisfier 168, training samples 174 and training parameters 176 for training routine 164, cluster probability lists/IDs 178 stored by training routine 164 and accessed by identification routine 166, and additional temporary storage for data such as the candidate probability list buffer. Data memory 170 also includes any data required by classifier 162, and therefore may include bitmaps, templates, or other representations of candidate characters or phonemes.

The implementation of FIG. 5 thus includes a component corresponding to each of the components in FIG. 1. Identification routine 166 corresponds to cluster identifier 12; constraint satisfier 168 corresponds to constraint satisfier 14; rules/pattern data 172 corresponds to rules/pattern data 18; and cluster probability lists/IDs 178 corresponds to character/probability data 20. Constraint satisfier 168 can thus use a cluster ID to access the corresponding probability list in cluster probability lists/IDs 178 if necessary in order to recognize a character or phoneme.

D. Miscellaneous

The invention could be implemented in many other ways within the scope of the claims.

The above described implementation could be modified to make optimal use of available bandwidth between the probability cluster identifier and constraint satisfier. One possible adjustment is to select the number of probability clusters so that cluster IDs of a given fixed length can be used. Another adjustment is to provide short cluster IDs for high frequency clusters and longer cluster IDs for low frequency clusters.

A constraint satisfier for use in the invention might take any of a wide variety of forms, including the recognition techniques described in copending, coassigned U.S. patent application Ser. No. 07/427,147, incorporated herein by reference. In general, application-tailored, multiple context, or dynamic context knowledge might be brought to bear on the recognition process by the constraint satisfier. Multiple spelling checkers might be used for multiple languages. Form field specific grammar driven spell checkers might also be used. Processes capable of taking advantage of the minimal redundancy in specialized input such as financial, time-oriented, or parts list information might be used. In addition to character recognition, the constraint satisfier might apply word recognition and font recognition to extract the content of the cluster IDs.

The implementation described above employs a single serial procesor for probability cluster identification and for constraint satisfaction. These functions could, however, be performed concurrently by parallel processors or in any other suitable manner, and each function could similarly be implemented on a multiprocessor or any other suitable architecture. Furthermore, if a single serial processor is used, conventional techniques such as multitasking could be applied.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method comprising steps of:
    obtaining a set of probability values for a character candidate, the set of probability values including a respective probability value for each of a set of character types, each character type's probability value indicating a probability that the character candidate is an instance of the character type; and
    using the set of probability values to identify which of a number of character probability clusters is nearest to the candidate; the character probability clusters being regions of a space; the space having a respective dimension for each of the character types; the character candidate's respective probability value for each character type indicating the character candidate's position in the character type's dimension so that the set of probability values define the character candidate's position in the space.

2. The method of claim 1, further comprising a step of storing respective probability data for each of the character probability clusters prior to the step of using the set of probability values.

3. The method of claim 2 in which the storing step comprises clustering sample probability data in order to obtain the character probability clusters.

4. The method of claim 2, further comprising a step of recognizing the candidate based on the respective probability data for the identified nearest probability cluster.

5. The method of claim 3 in which the respective probability data of each cluster is a set of probability values, the set of probability values including a respective probability value for each of a set of recognizable character types.

6. The method of claim 1 in which the step of using the set of probability values comprises a substep of obtaining data identifying the nearest probability cluster, the method further comprising a step of obtaining data identifying a character type of the candidate character based on the data identifying the nearest cluster.

7. The method of claim 6 in which the cluster identifying data is a cluster ID.

8. A system comprising:
a classifier for providing a set of probability values for a character candidate; the set of probability values including a respective probability value for each of a set of character types, each character type's probability value indicating a probability that the character candidate is an instance of the character type;
a probability cluster identifier for using the set of probability values to produce data identifying which of a number of character probability clusters is nearest to the character candidate; the character probability clusters being regions of a space; the space having a respective dimension for each of the character types; the character candidate's respective probability value for each character type indicating the character candidate's position in the character type's dimension so that the set of probability values define the character candidate's position in the space; and
a constraint satisfier for providing data identifying a character type of the character candidate based on the cluster identifying data from the probability cluster identifier.

9. The system of claim 8 in which the probability cluster identifier produces a cluster ID identifying the nearest cluster.

10. The system of claim 8, further comprising stored probability data including respective probability data for each of the character probability clusters, the constraint satisfier using the cluster identifying data to access the respective probability data of the identified nearest cluster.

11. The system of claim 10 in which the respective probability data for each cluster includes a respective set of probability values for the cluster, each cluster's respective set of probability values including a respective probability value for each of the character types.

12. The system of claim 10 in which the classifier is further for providing respective probability data for a set of sample characters; the system further comprising a trainer for storing the respective probability data for each of the character probability clusters based on the respective probability data for the sample characters.

13. The system of claim 12 in which the trainer is further for obtaining the character probability clusters and the respective probability data for each of the clusters by clustering the probability data for the sample characters.

14. A method comprising steps of:
obtaining a set of probability values for a phoneme candidate, the set of probability values including a respective probability value for each of a set of phoneme types, each phoneme type's probability value indicating a respective probability that the phoneme candidate is an instance of the phoneme type; and
using the set of probability values to identify which of a number of phoneme probability clusters is nearest to the candidate; the phoneme probability clusters being regions of a space; the space having a respective dimension for each of the phoneme types; the phoneme candidate's respective probability value for each phoneme type indicating the phoneme candidate's position in the phoneme type's dimension so that the set of probability values define the phoneme candidate's position in the space.

15. The method of claim 14, further comprising a step of storing respective probability data for each of the phoneme probability clusters prior to the step of using the set of probability values.

16. The method of claim 15 in which the storing step comprises clustering sample probability data in order to obtain the phoneme probability clusters.

17. The method of claim 15, further comprising a step of recognizing the candidate based on the respective probability data for the identified nearest probability cluster.

18. The method of claim 15 in which the respective probability data of each cluster is a set of probability values, the set of probability values including a respective probability value for each of a set of recognizable phoneme types.

19. The method of claim 14 in which the step of using the set of probability values comprises a substep of obtaining data identifying the nearest probability cluster, the method further comprising a step of obtaining data identifying a phoneme type of the candidate based on the data identifying the nearest cluster.

20. The method of claim 19 in which the cluster identifying data is a cluster ID.

21. A system comprising:
a classifier for providing a set of probability values for a phoneme candidate; the set of probability values including a respective probability value for each of a set of phoneme types, each phoneme type's probability value indicating a probability that the phoneme candidate is an instance of the phoneme type;
a probability cluster identifier for using the set of probability values to produce data identifying which of a number of phoneme probability clusters is nearest to the phoneme candidate; the phoneme probability clusters being regions of a space; the space having a respective dimension for each of the phoneme types; the phoneme candidate's respective probability value for each phoneme type indicating the phoneme candidate's position in the phoneme type's dimension so that the set of probability values define the phoneme candidate's position in the space; and
a constraint satisfier for providing data identifying a phoneme type of the phoneme candidate based on the cluster identifying data from the probability cluster identifier.

22. The system of claim 21 in which the probability cluster identifier produces a cluster ID identifying the nearest cluster.

23. The system of claim 21, further comprising stored probability data including respective probability data for each of the phoneme probability clusters, the constraint satisfier using the cluster identifying data to access the respective probability data of the identified nearest cluster.

24. The system of claim 23 in which the respective probability data for each cluster includes a respective set of probability values for the cluster, each cluster's respective set of probability values including a respective probability value for each of the phoneme types.

25. The system of claim 23 in which the classifier is further for providing respective probability data for a set of sample phonemes; the system further comprising a trainer for storing the respective probability data for each of the phoneme probability clusters based on the respective probability data for the sample phonemes.

26. The system of claim 25 in which the trainer is further for obtaining the phoneme probability clusters and the respective probability data for each of the clusters by clustering the probability data for the sample phonemes.

* * * * *